United States Patent [19]

Bracalielly et al.

[11] 4,187,275

[45] Feb. 5, 1980

[54] METHOD AND APPARATUS FOR PRODUCING SHAPED GLASS FIBER REINFORCED CEMENTITIOUS ARTICLES

[75] Inventors: Albert J. Bracaliely, Mars; Glenn E. Kautz; Robert G. Lindner, both of Sewickley, all of Pa.; Bernard H. Davis, Stoney Creek, Canada

[73] Assignee: H. H. Robertson Company, Pittsburgh, Pa.

[21] Appl. No.: 479,428

[22] Filed: Jun. 14, 1974

[51] Int. Cl.² .......................... B32B 13/08; B32B 13/12

[52] U.S. Cl. ....................................... 264/511; 156/40; 156/44; 156/201; 264/145; 264/171; 264/175; 264/309; 264/555

[58] Field of Search ...................... 264/76, 90, 91, 112, 264/113, 115, 121, 166, 171, 175, 309, 316, 145, 511, 555; 156/39, 40, 44, 201

[56] References Cited

U.S. PATENT DOCUMENTS

| | | | |
|---|---|---|---|
| 582,060 | 5/1897 | Hitchins | 264/175 X |
| 837,717 | 12/1906 | Perry | 264/121 |
| 1,790,252 | 1/1931 | Speer | 156/40 |
| 2,038,801 | 4/1936 | McQuade | 264/112 X |
| 2,281,591 | 5/1942 | Moore | 264/113 |
| 2,363,226 | 11/1944 | Brund | 264/175 X |
| 2,445,210 | 7/1948 | Colton | 264/113 X |
| 2,655,196 | 10/1953 | Magnani | 264/316 |
| 2,944,291 | 7/1960 | Prior | 264/175 X |
| 3,017,305 | 1/1962 | Dailey | 156/44 X |
| 3,226,457 | 12/1965 | Smith | 264/90 |
| 3,539,316 | 11/1970 | Trethewey | 264/121 X |
| 3,616,173 | 10/1971 | Green | 156/39 |

FOREIGN PATENT DOCUMENTS 1204541 9/1970 United Kingdom .

OTHER PUBLICATIONS

Webster's New World Dictionary, p. 917.

*Primary Examiner*—Thomas P. Pavelko

*Attorney, Agent, or Firm*—Harry B. Keck; George E. Manias

[57] ABSTRACT

A method and apparatus for forming shaped articles from glass fiber reinforced gypsum. An aqueous slurry of gypsum hemi-hydrate, water and glass fibers contains between 22 and 45 parts by weight water, 100 parts by weight gypsum hemi-hydrate and 3 to 10 parts by weight glass fiber. The slurry is deposited as a continuous ribbon on a moving, water-impermeable formable sheet which is pre-shaped and thereafter the slurry ribbon is pressed into a desired profile. The formable sheet and slurry ribbon are maintained in the desired profile until the slurry sets. Thereafter the product ribbon is cut transversely into lengths as desired. The formable sheet may be removed before cutting, or may be retained in engagement with the product ribbon during and after cutting to serve as a protective cover for the surface of the article. The process and apparatus are especially adapted to produce liner sheets for building construction panels. The process and apparatus also are applicable to producing continuous ribbons of other dough-like formable compositions such as glass-fiber reinforced cement.

11 Claims, 24 Drawing Figures

METHOD AND APPARATUS FOR PRODUCING SHAPED GLASS FIBER REINFORCED CEMENTITIOUS ARTICLES

BACKGROUND OF THE INVENTION

1. Field of the Invention

The invention relates to shaped articles formed from glass fiber reinforced cementitious compositions, especially glass fiber reinforced gypsum, but more particularly to a process and apparatus for making such shaped articles.

2. Description of the Prior Art

Gypsum has been used as a casting and molding material for many years. Gypsum is known as plaster of Paris and is the hemi-hydrate of calcium sulfate. 100 parts by weight of the gypsum hemi-hydrate combine stoichiometrically with 18.6 parts by weight of water to form a hard, set plaster containing two mols of combined water. In order to prepare a workable, pumpable, moldable, dough-like composition, the gypsum hemi-hydrate is combined with an excess of water in addition to the 18.6 parts by weight which are required for the conversion of the hemi-hydrate into a set plaster. With ordinalry calcined gypsum, also known as beta hemi-hydrate, the gypsum customarily is combined with more than 50 percent of its weight of water in order to achieve a pouring consistency. It is possible to achieve a pouring consistency with less than 50 percent water when the gypsum is in the form of crystaline calcined gypsum also known as alpha hemi-hydrate. See U.S. Pat. No. 1,901,051—RANDEL et al. Moldable compositions containing 40 parts of water for every 100 parts of dry powder (predominantly alpha hemi-hydrate) have been described. See U.S. Pat. No. 2,494,403—NIES et al.

Structurally reinforced articles formed from gypsum and glass fibers have been described wherein the glass fibers are mixed into a slurry of gypsum hemi-hydrate and water. See U.S. Pat. Nos. 3,062,670—MARZOCCHI et al; 2,681,863—CROCE et al and 3,147,127—SHANNON. In all of these glass fiber reinforcement processes involving preparation of a slurry containing glass fibers, the act of mixing the fibers introduces a tendency to break the fibers into short lengths. It has been reported that 0.1 percent of textile fibers (diameter 0.0004 inch) cannot be admixed with the gypsum slurry whereas 3 percent of larger diameter fibers (0.003 inch) can be added to a moldable gypsum slurry with ease. See U.S. Pat. No. 3,062,670 supra.

A significant development in glass fiber reinforced gypsum technology is set forth in British patent 1,204,541—National Research Development Corporation. The significant new development avoids mixing of glass fibers in a gypsum slurry but instead prepares an admixture of gypsum hemihydrate, water and glass fibers by spraying an aqueous slurry of the gypsum hemi-hydrate into a stream of freshly chopped glass fibers or onto a preformed mat formed from randomly oriented glass fibers. Glass fibers reinforced gypsum is known as GRG.

In order to achieve adequate wetting of the glass fibers in the British process, a substantial excess of water is employed in the aqueous slurry—that is, an excess over the stoichiometric amount required to combine with the gypsum hemi-hydrate. Slurries containing 50 percent by weight of water and more are proposed. The British patent process thus prpepares a watery slurry containing gypsum hemi-hydrate and glass fibers. The excess water is initially removed by vacuum removal or by pressure to produce a composition which still contains an excess of water over the stoichiometric amount required for the gypsum hemi-hydrate and contains enough water to provide a moldable and workable plaster which exists for a short period of time until the gypsum becomes set. The removal of the excess water is a difficult task. One technique for removing the water has been to form the dilute slurry on a porous formable sheet, such as a sheet of Kraft paper, and to pass the porous formable sheet containing the dilute slurry over a suction box which has facilities for extracting water from the dilute slurry through the Kraft paper which functions as a filter septum. Nonetheless, the British patent process is capable of producing glass fiber reinforced gypsum articles of remarkable strength characteristics as a result of retaining relatively long length glass fibers in a random orientation in the final article.

It would certainly be desirable to eliminate the cumbersome and expensive water removal stage which is necessitated in the process described in the British patent. It is also desirable to develop a process for producing glass fiber reinforced gypsum articles on a continuous basis in a variety of profiled shapes. Such profiled shapes can be employed in producing products of the type described in co-pending U.S. Patent applications 293,331, filed Sept. 29, 1972; 328,968, filed Feb. 2, 1973; and 328,969 filed Feb. 2, 1973, which are assigned to an assignee of the present invention. The profiled shapes also can be employed to produce liner sheets for building construction panels as will be hereinafter described.

The process and apparatus which have been developed to produce articles from glass fiber reinforced gypsum are also applicable to treatment of other dough-like materials which can be shaped, then hardened, e.g., glass fiber reinforced cement (U.S. Pat. Nos. 3,716,386; 3,783,092).

SUMMARY OF THE INVENTION

One object of invention is to provide a method and apparatus for producing structural shapes and products from dough-like compositions, particularly from glass fiber reinforced gypsum. A further object is to provide a process which employs relatively concentrated aqueous slurry of gypsum hemi-hydrate, and particularly slurries which can be molded and shaped without requiring an intermediate stage for elimination of excess water. A further object is to provide a continuous method and apparatus for producing continuously shaped articles from glass fiber reinforced gypsum.

Specifically, the present articles are fabricated from a slurry which contains 100 parts by weight gypsum hemi-hydrate; 22–45 parts by weight water; 3–10 parts by weight glass fibers.

The gypsum hemi-hydrates may be alpha hemi-hydrate, beta hemi-hydrate, or a mixture of the two. The alpha hemi-hydrate is preferred, despite its greater expense, because it permits molding of the resultant materials with less water content and yields products with greater tensile and flexural strength. The beta hemi-hydrate is desirable because of its low initial cost. A compromise between cost and performance suggests a mixture of alpha hemi-hydrate and beta hemi-hydrate as a possible composition.

The glass fibers preferably are provided in the form of chopped glass roving of any conventional glass fiber having a diameter ranging from 0.0003 to about 0.005 inch. The fiber may be of uniform length or ordered lengths or random lengths. The fiber length average should be in the range of about 0.5 to 4.0 inches. Chopped glass fiber roving from a chopper set to cut 2 inch lengths has proved quite useful. The glass fibers also may be provided in the form of a preformed randomly oriented glass fiber mat.

The slurry also may contain other functional additives for purposes well-known in the gypsum arts, for example, setting regarders such as calcium oxide, sodium hydroxide; and accelerators such as phosphoric acid, sulfuric acid, inorganic pigment; fillers such as ground silica, asbestos, mica, fully hydrated gypsum; and sizing materials such as water-soluble animal glue.

In accordance with this invention, it has been discovered that adequate wetting of glass fiber reinforcement can be achieved with relatively concentrated aqueous slurries of gypsum hemi-hydrate. The resulting slurry of aqueous gypsum hemi-hydrate and glass fibers can be formed and shaped so long as there is only limited migration of the glass fibers after they have been randomly deposited. The glass fibers and slurry are deposited on a moving water impermeable formable sheet such as a film of polyethylene, cellophane or coated paper.

In accordance with this invention, the impermeable formable sheet is drawn through processing apparatus as a continuous strip and is pre-shaped to a pre-selected profile prior to deposition of the glass fibers and gypsum slurry. It is not required that the formable sheet pre-shaping be congruent with the ultimate desired shape—and in fact the preshaping normally will not be congruent with the ultimate desired shape of the formable sheet.

The thickness of the deposited gypsum slurry and glass fibers is about 1/6 inch to about 2 inches. It is within the scope of this invention to apply several lengthwise bands of aqueous gypsum slurry and glass fibers to produce an overall ribbon having differential thicknesses across the width. The slurry ribbon and the formable sheet constitute a two-layer laminate. The formable sheet is shaped into the desired bottom surface profile and concurrently the dough-like ribbon is compacted to produce the desired upper surface profile and to fill in the contours of the shaped formable sheet. The compaction equipment may include rollers which "work" the upper surface of the dough-like ribbon in the manner of pastry rollers to produce a uniform thickness. The compaction equipment alternatively may provide for selective bands of relatively thick and relatively thin dough-like ribbon to accommodate differential thickness requirements in the final product. The compaction equipment also includes side rails having shaped surfaces along the edges and/or the central part of the laminate passageway to retain the desired profile of the laminate. The laminate thereafter retains the constant desired profile until the aqueous gypsum slurry has become set. After an initial set occurs, the laminate can be maintained and supported in its desired profile. The side edges of the laminate may be finished by employing side cutting saws to trim the side edges of the resulting product and to cut through the formable sheet. The continuous shaped article may be cut to length by a suitable guillotine or travelling saw either before or after removal of the formable sheet.

The resulting products can be fabricated to close dimensional tolerances and can be produced with exceptional strength characteristics.

A preferred apparatus for producing the present glass fiber reinforced articles includes a continuous work table having facilities such as a driven conveyor belt for advancing a water impermeable formable sheet sequentially through a formable sheet pre-shaping station, a slurry deposition station, a formable sheet shaping station, a compaction station and a curing station. The apparatus includes spool means for delivering the formable sheet as a continuous ribbon, glass fiber depositing means and aqueous gypsum hemi-hydrate slurry spraying means. The glass fiber depositing means may include a chopper for glass fiber roving which will be positioned above the work table. The glass fiber depositing means may include alternatively or in addition one or more spools of preformed randomly oriented glass fiber mat. In a preferred embodiment, a chopper for glass fiber roving is employed to produce a curtain of descending discrete glass fibers across the ribbon. One or more slurry sprays impinge against the downwardly moving stream of chopped glass fibers to accomplish some wetting of the fibers while they remain airborne. The glass fibers and aqueous gypsum spray are preferably deposited between a pair of side walls to confine overspray. The formable sheet and covering dough-like ribbon as a laminate is advanced along the work table and a compressive stress is applied in the compaction zone to shape the upper surface and bottom surface of the ribbon.

Normally the membrane will receive a film of aqueous gypsum slurry directly before any glass fibers are deposited thereon. This initial film of slurry will form a smooth outer surface (the surface engaging the formable sheet) for the resulting article, substantially free from any visual indications of the presence of glass fibers. Where the water impermeable formable sheet is a flat smooth film, the resulting formable sheet engaged surface of the resulting article will be smooth and shiny. It is within the scope of this invention to employ as the formable sheet a textured film wherein the water impermeable formable sheet has a textured surface in a waffle pattern or a diamond pattern or any other suitable non-flat patterns. It is further preferred that the curtain of descending discrete glass fibers be deposited between upstream slurry sprays and downstream slurry sprays to maximize fiber wetting and minimize undesirable airborne distribution of glass fibers. The aqueous gypsum slurry can be deposited from fixed, directed sprays such as fan sprays or cone sprays. Oscillating spray nozzles also may be employed if desired.

The operations within the slurry deposition station 16 can also be seen in FIGS. 13 and 14 wherein the formable sheet 22 and moving belt 11 move from left to right as a unit. The slurry sprays 39 deposit a film of aqueous gypsum slurry directly against the formable sheet 22. A glass fiber chopper 38 receives glass rovings from spools 37 and generates a cloud 40 of glass fibers which descends toward the formable sheet 22. The nozzles 42 direct a spray of aqueous gypsum slurry against the formable sheet 22. The cloud 40 of glass fibers is wetted by the sprays from the nozzles 39, 42.

The velocity at which the formable sheets 22 moves from left to right in FIGS. 13 and 14 will, in some measure, determine the thickness of the resulting ribbon 41. The flow rate of aqueous gypsum slurry from the nozzles 39, 42 also must be considered. The rate of developing chopped glass fibers as a cloud 40 by the chopper 38 will establish the glass fiber content of the ribbon.

In order to improve the fiber settling and to eliminate air bubbles and surface irregularities, it may be desirable to introduce mechanical vibration into the laminate after the dough-like ribbon has been deposited on the water impermeable membrane. Suitable vibrating plates can be installed prior to the ribbon compaction stage or following the ribbon compaction stage or both for the purpose of settling errant glass fibers and eliminating gas bubbles.

Thereafter the work table extends linearly for sufficient distance to develop an initial set in the advancing laminate. The time required to develop the initial set is a function of the retarders, accelerators, and physical characteristics of the gpysum hemi-hydrate. The speed of the advancing laminate is regulated according to the time required for an initial set so that the laminate will be self-sustaining at the end of the work table.

At the far end of the work table, means may be provided for trimming the side edges of the laminate. Means are also provided for cutting to length the continuous ribbon of profiled product. Heat sources, for example, heat lamps, are provided for extracting substantially all of the uncombined water from the profiled final product.

DESCRIPTION OF THE PREFERRED EMBODIMENT(S)

Figures 1, 2:
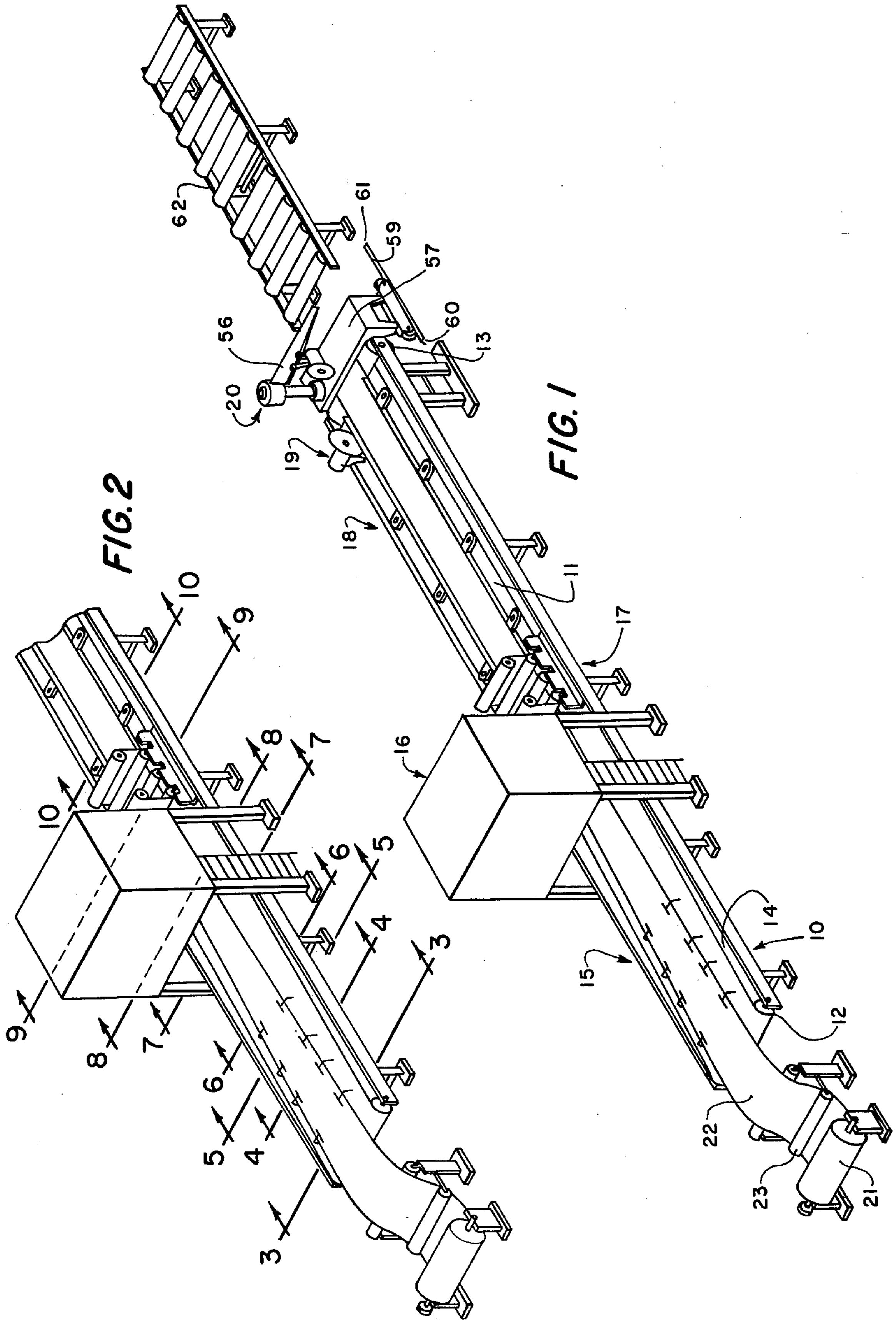
FIG. 1 is a perspective illustration of apparatus for practicing the process.
FIG. 2 is a fragmentary portion of FIG. 1 with section lines drawn to indicate sections which are illustrated in FIGS. 3–10 inclusive.

The apparatus of FIG. 1 includes a work table 10 which may be covered with a continuous moving belt 11 passing from a belt roller 12 at the inlet to a belt roller 13 at the exit end. The work table 10 has a smooth upper flat surface 14 over most of its length on which the upper pass of the moving belt 11 lies. The system includes a formable sheets pre-shaping station 15, a slurry deposition station 16, a slurry ribbon compaction and shaping station 17, a setting station 18, a side edge trim station 19 and a transverse cutoff station 20.

A spool 21 of flexible, water impervious formable sheets 22 is provided at the forward end of the work table 10. The formable sheet preferably is polyethylene sheet although cellophane sheets and other water impervious plastic sheets may be used such as polyvinyl fluoride sheets, polyvinyl chloride, polyvinylidine chloride sheets, polyethylene terephthalate sheets, coated paper sheets and the like. The formable sheet 22 is drawn over a shaping and tensioning roll 23 and extends therefrom along the entire length of the work table 10 in surface engagement with the upper surface of the upper pass of the moving belt 11.

Figure 4:
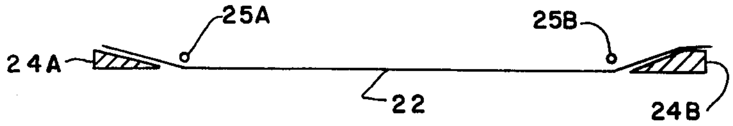
Figure 3:
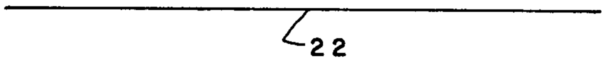

The formable sheet 22 is pre-shaped into a trough-like profile in the formable sheet shaping station 15 by passing along, over and through shaping elements of suitable shapes to develop an acceptable profile to facilitate subsequent final shaping. The formable sheet 22, after passing the tensioning roll 23, has an essentially flat profile as seen in FIG. 3. As the formable sheet 22 enters the preshaping station 15, a preliminary shape is introduced by means of forming ramps 24A, 24B as better seen in FIG. 4. The central portion of the formable sheet 22 is maintained in surface engagement with the moving belt by means of forming elements 25A, 25B.

Figure 5:
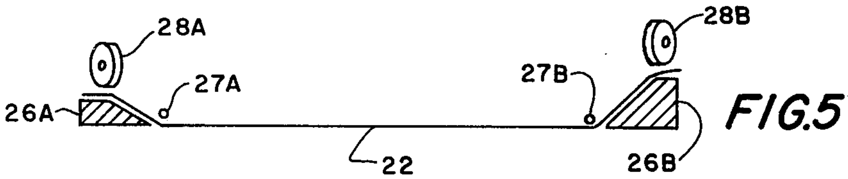

The formable sheet 22 advances to the next set of forming ramps 26A, 26B as shown in FIG. 5. Forming elements 27A, 27B maintain the central portion of the formable sheet 22 in surface engagement with the moving belt. Plastic or rubber surfaced wheels 28A, 28B are provided above the outboard edges of the forming ramps 26A, 26B to maintain edge-to-edge tension in the formable sheet 22 and to maintain the formable sheet in surface engagement with the forming ramps 26A, 26B.

Figure 6:
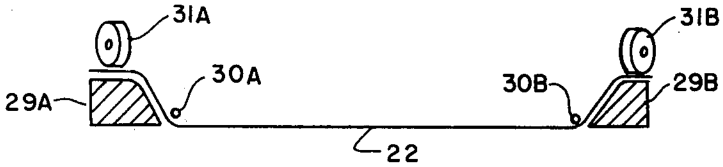

A further shaping of the formable sheet 22 is accomplished by forming ramps 29A, 29B and forming elements 30A, 30B as shown in FIG. 6. Plastic surfaces wheels 31A, 31B maintain the edges of the formable sheet 22 in engagement with the ramps 29A, 29B. The axes of the wheels 28A, 28B, 31A, 31B are angled relative to the line of movement of the formable sheet 22.

Figure 7:
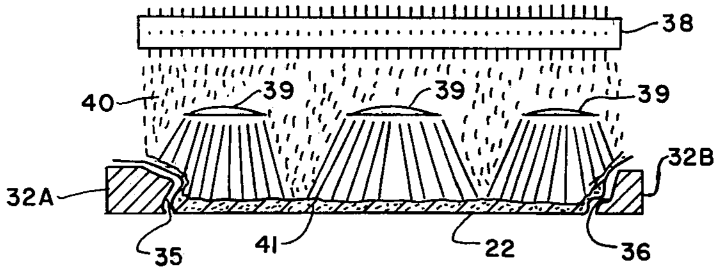

The formable sheet 22 is pre-shaped as shown in FIG. 7 wherein side forming ramps 32A, 32B define the formable sheet edge. It will be observed that the forming ramp 32A has an undercut recess 35 in which the formable sheet 22 is introduced. It will also be observed that the forming ramp 32B has a concave surface 36.

Figure 11:
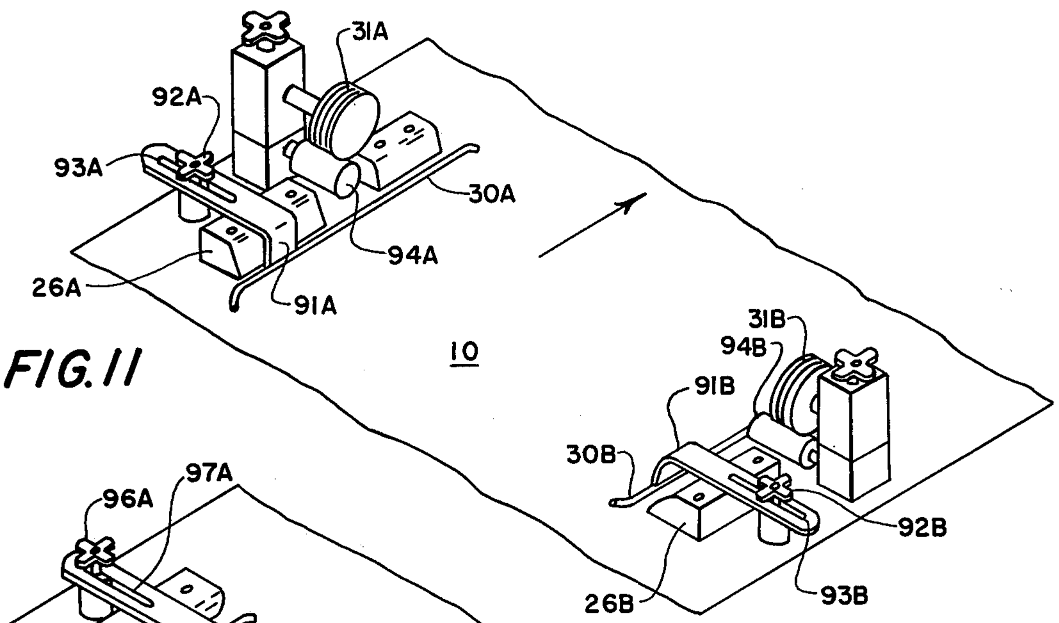
FIG. 11 is a fragmentary perspective illustration of typical formable sheet pre-shaping equipment.
Figure 12:
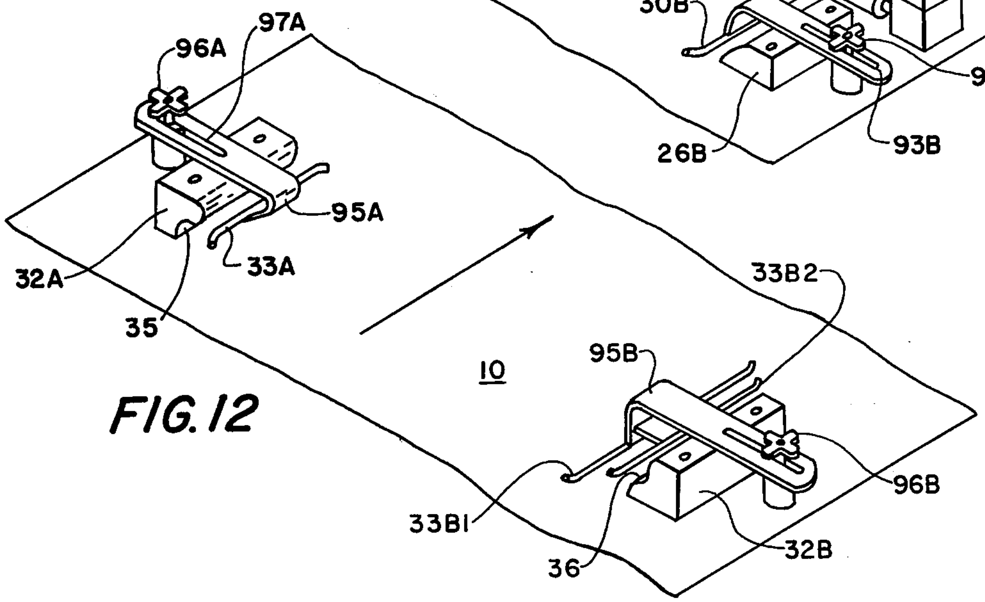
FIG. 12 is a fragmentary perspective illustration of additional formable sheet pre-shaping equipment.

Typical forming ramps and forming elements of the type employed in the formable sheet shaping section are more fully illustrated in FIGS. 11 and 12. As shown in FIG. 11, a forming ramp 26A extends along one side of the work table 10 and a forming ramp 26B extends along the other side of the forming table 10. The forming elements 30A, 30B constitute rod-shaped units which are secured to brackets 91a, 91B respectively which are mounted by hold-down screws 92A, 92B respectively which engage slots 93A, 93B within the brackets 91A, 91B respectively. The impermeable formable sheet is stretched between the forming members 30A, 30B and rides over the upper surfaces of the forming ramps 26A, 26B and between a pair of rolls 31A, 94A and a pair of rolls 31B, 94B. The rolls 31A, 31B are rotatably mounted on a shaft whereby the rolls rotate in a plane which is outwardly flared with respect to the movement of the formable sheet, thereby applying a positive side-to-side stress to maintain the formable sheet in a stretched condition.

In FIG. 12 formable sheet shaping apparatus including forming ramps 32A, 32B and forming members 33A, 33B1 and 33B2. The forming ramps 32A, 32B are secured to the work table 10. The forming members 33A are secured to a bracket 95A which is secured by a hold-down screw 96A fitted into a slot 97A. The forming members 33B1 and 33B2 are both secured to a bracket 95B which is mounted to the work table 10 by means of a hold-down screw 96B in a slot 97B. It will be observed that the forming member 33A is disposed underneath the curved inboard surface 35 of the forming ramp 32A. Similarly the forming member 33B1 is positioned adjacent to the surface of the work table 10 whereas the forming member 33B2 is positioned adjacent to the concave inboard surface 36 of the forming ramp 32B.

Figure 8:
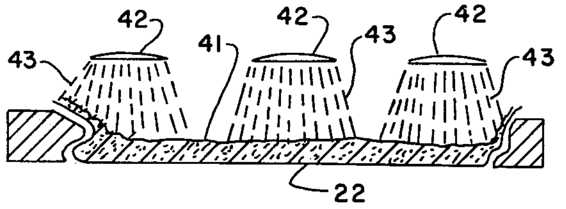

Within the slurry deposition station 16, FIG. 7, spray nozzles 39 deposit a film of aqueous gypsum slurry onto the upper surface of the formable sheet, 22. Subsequently one or more glass fiber strand chopping units 38 deposits a cloud 40 of chopped glass fiber strands on top of the initial slurry film to form a glass fiber slurry ribbon 41. Thereafter, FIG. 8, additional spray nozzles 42 deposit sprays 43 of aqueous gypsum slurry which coalesce with previously deposited slurry and glass fibers to complete the dough-like ribbon 41.

The aqueous gypsum slurry of this invention is provided in a composition which requires little dewatering in order to become set.

Figure 9:
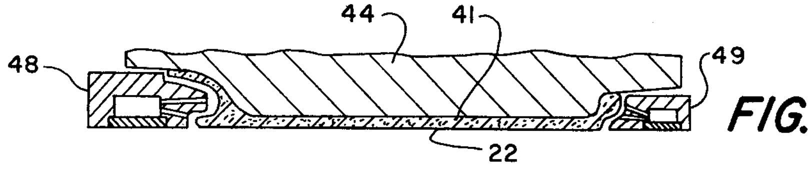
Figure 15:
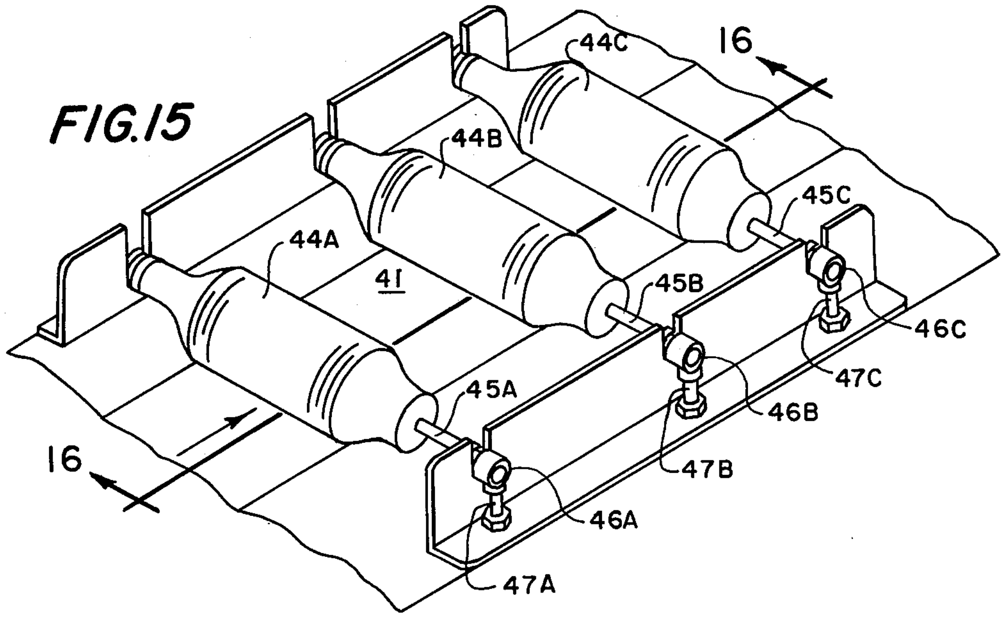
FIG. 15 is a fragmentary perspective illustration of compacting rolls and mounting means for such compacting rolls.
Figure 13:
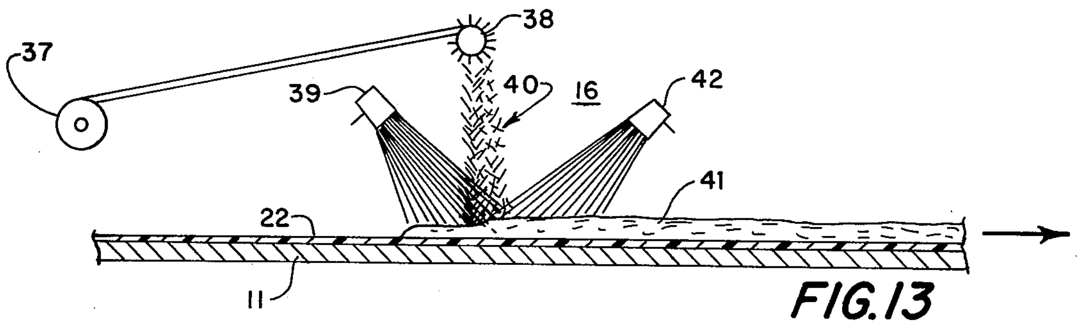
FIG. 13 is a side elevation view, partly schematic, of the interior of the ribbon forming station 16 of FIG. 1.
Figure 14:
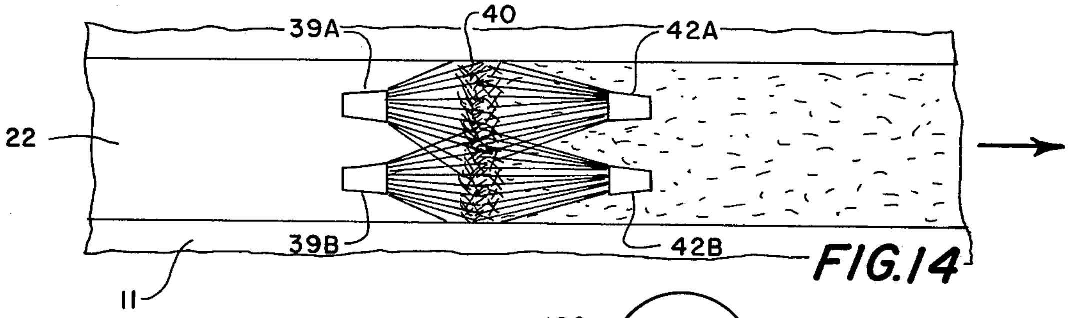
FIG. 14 is a plan view, partly schematic, of the interior of the ribbon forming station 16 of FIG. 1.

To shape the aqueous gypsum and glass fiber ribbon 41, the formable sheet 22 and ribbon 41 are advanced to a slurry compacting station 17, FIG. 9, wherein a suitable roller 44 engages the upper surface of the ribbon 41 and rolls and compacts the ribbon much in the manner of rolling pastry dough so that the upper surface of the ribbon develops a preestablished contour before the slurry sets. The roller 44 also presses the dough-like ribbon 41 and membrane against side rails 48, 49. A typical contouring roll 44 is illustrated in FIG. 9 wherein the ribbon 41 has the pre-established overall profile which is desired. Additional rolls 44A, 44B, 44C are illustrated in FIG. 15 in contact with a slurry ribbon 41. The contoured rolls 44A, 44B, 44C are mounted on shafts 45A, 45B, 45C respectively which are supported in bushings 46A, 46B, 46C respectively. Adjustment screws 47A, 47B, 47C are provided to establish the desired thickness of the ribbon 41. The contoured rolls 44A, 44B, 44C are preferably driven at a peripheral velocity corresponding to the line speed of the ribbon 41. The contoured rolls 44A, 44B, 44C are preferably scored with peripheral grooves from 1/16 inch to ¼ inch wide and from 1/16 inch to ¼ inch deep to facilitate compaction of the ribbon.

Figure 16:
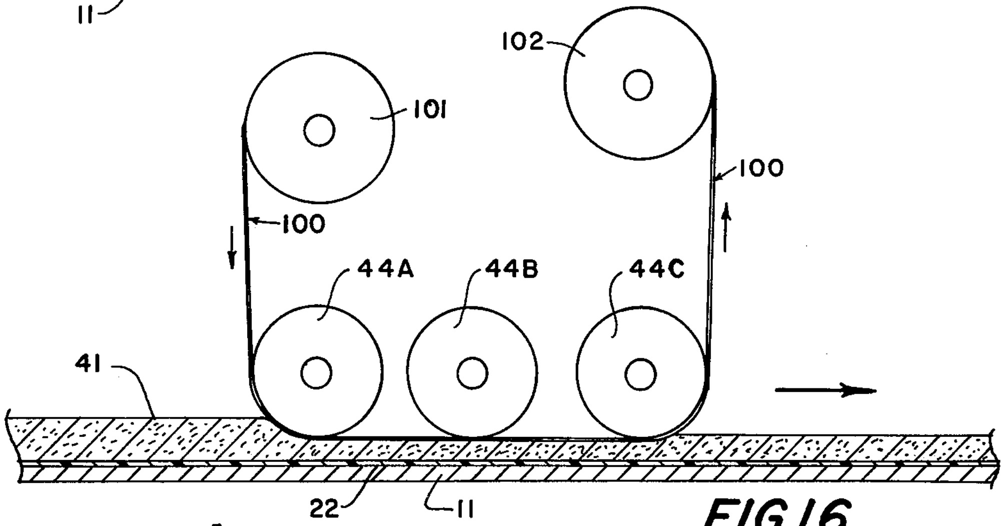
FIG. 16 is a sectional view taken along the center line 16—16 of FIG. 15 showing compaction rolls and a preferred protective formable sheet therefor.

As a further refinement of the slurry compacting station 17, the compacting rolls shown in FIG. 16 are separated from the dough-like ribbon 41 by a thin separator film. The film is identified by the numeral 100 and is shown as being unwound from a spool 101 and rewound on a spool 102. The film 100 has a width greater than the width of the ribbon 41 and serves to prevent adhesion of the dough-like material in the ribbon 41 onto the compacting rollers 44A, 44B, 44C. The film 100 is preferably employed on a once-through basis. The linear velocity of the film 100 corresponds to the linear velocity of the dough-like ribbon 41. It has been found in the absence of the film 100 that particles of the ribbon 41 tend to adhere to the periphery of the compacting rollers 44 creating small cavities in the ribbon 41. The film 100 should be preferably water impervious and can be the same materials which are employed in the membrane 22.

In a further alternative, not illustrated, the takeup roll 102 can be advanced downstream from the compactor rolls 44. It is preferred to remove the film 100 promptly because its presence may retard the elimination of uncombined water from the ribbon 41.

Figure 10:
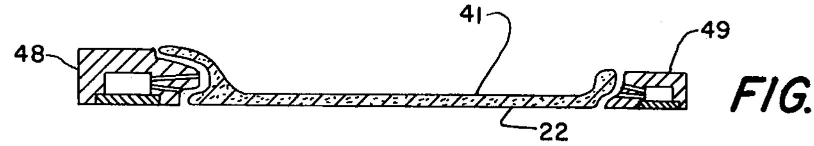
FIGS. 3–10 are cross-sectional illustrations taken along the lines 3—3, 4—4, 5—5, 6—6, 7—7, 8—8, 9—9 and 10—10 of FIG. 2.
Figure 17:
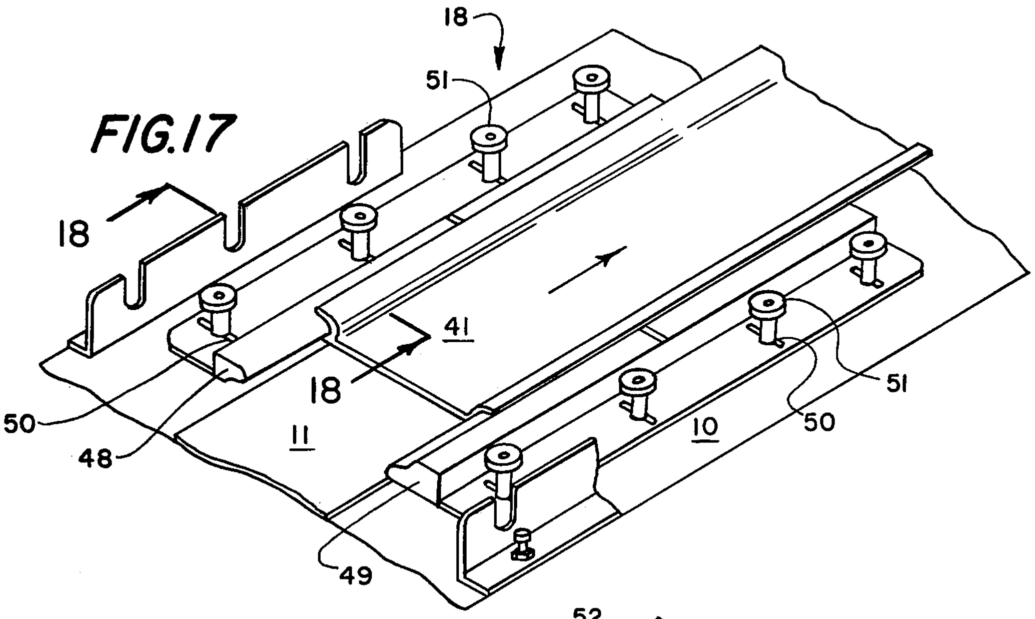
FIG. 17 is a fragmentary illustration of the setting station.

After the shaped dough-like ribbon is compacted, it continues to advance along the work table 10 in contact with the side rails 48, 49 as seen in FIGS. 10 and 17 through the slurry setting station 18. The side rails 48, 49 have a uniform cross-section along their entire length and are adjustably secured to the work table 10 by means of slots 50 and hold-down screws 51. As the formable sheet 22 and ribbon 41 are drawn on the moving belt 11 through the slurry setting station 18, the residence time in the slurry setting station 18 is sufficient to develop an initial set for the ribbon 41.

Figure 18:
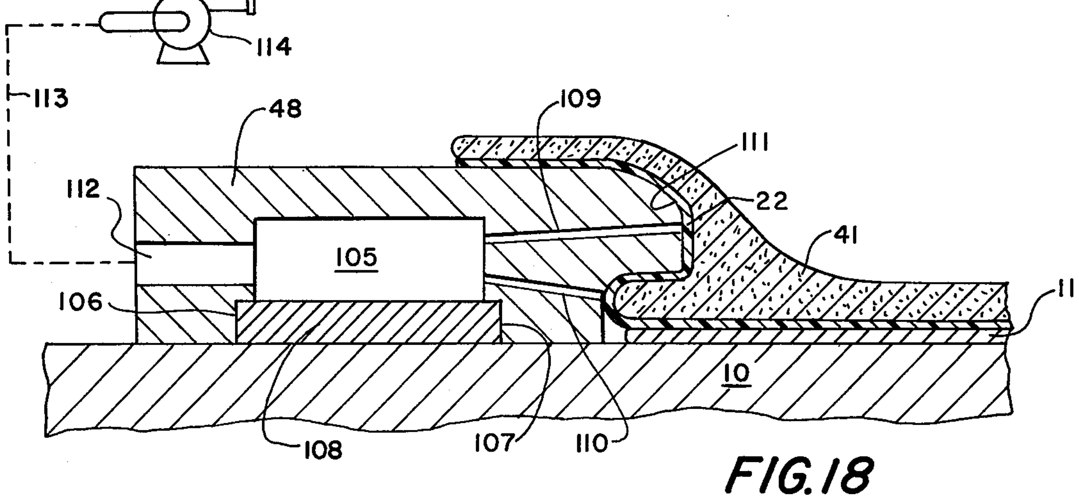
FIG. 18 is a cross-section view, partly schematic, of a side rail taken along the line 18—18 of FIG. 17.

Within the slurry shaping station 17, the side rails are provided with suction means on their inboard surfaces to maintain a close surface engagement of the impervious formable sheet 22. This is illustrated more clearly in FIG. 18 wherein one of the side rails 48 is routed on its undersurface to provide a channel 105 with rebates 106, 107. A strip 108 of wood or plastic or metal is applied over the channel 105 and engaged with the rebates 106, 107 to close off the channel 105. Communicating from the channel 105 are a plurality of bores 109, 110 which extend to an inboard surface 111 of the rail 48. An additional bore 112 extends from the channel 105 through a suitable conduit shown schematically by the dotted line 113 to a source of vacuum such as a pump 114.

The channel 105 extends over a substantial portion of the rails 48, 49, for example, a distance of 6 to 8 feet in a typical installation.

The bores 109, 110 have a diameter in the range of about 1/32 inch to about ¼ inch. The vacuum source 114 provides a reduced pressure of the order of 10 to 15 inches of mercury.

The use of the suction forming side rails 48, 49 eliminates the need for extensive pre-shaping of the impervious formable sheet 22 before application of the aqueous gypsum slurry and reinforcing fibers.

Figure 19:
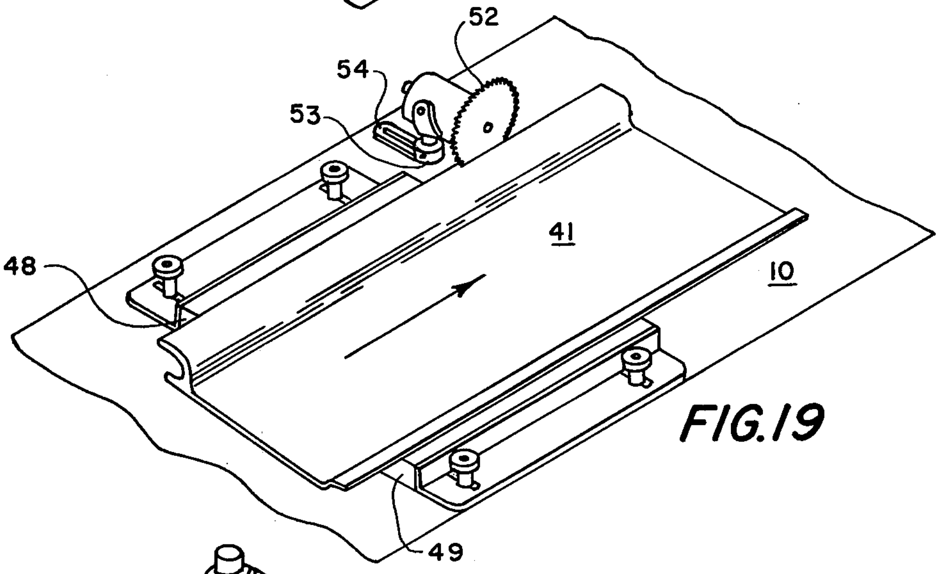
FIG. 19 is a fragmentary illustration of the side saws.

After the ribbon 41 has developed a set, the selvedge may be removed from each side of the ribbon 41 by means of a side mounted rotary saw 52 as seen in FIG. 19. The resulting selvedge is removed laterally into a container (not shown) at the side of the work table 10. The side mounted saw 52 is supported by hold-down screws 53 in suitable slots 54.

Figure 20:
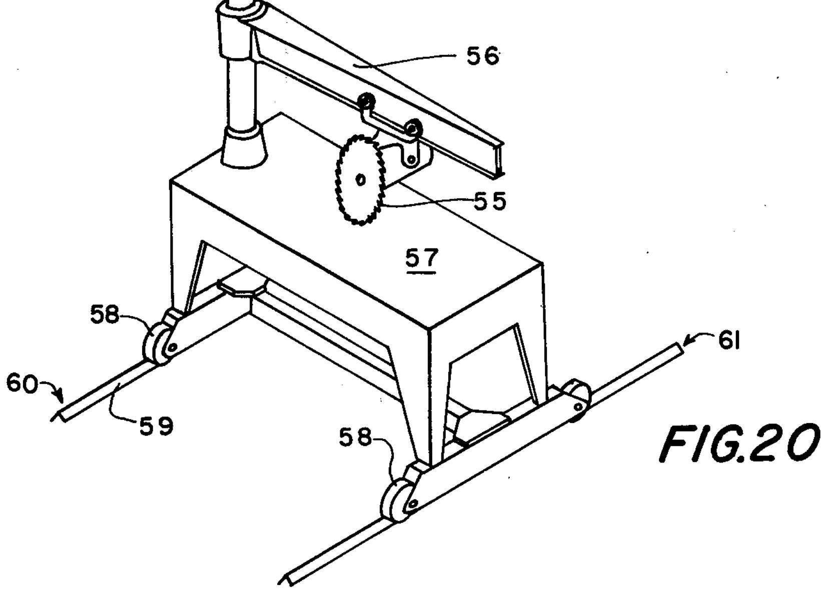
FIG. 20 is a fragmentary perspective illustration of a transverse cutting saw.

As shown in FIG. 20, a transverse cutting saw 55 is mounted for horizontal oscillation on an arm 56 which is secured to a travelling support bench 57 mounted on wheels 58 which rest upon rails 59 which are parallel with the direction of movement of the moving belt 11. It will be observed that the rails 59 are presented downstream from the exit belt roller 13 so that the cutting action of the saw 55 will not interfere with the moving belt 11 (FIG. 1). The saw 55 commences its cut with the moving table 57 at the starting end 60 of the rails 59. The transverse cut of the ribbon 41 is completed before the wheels 58 reach the other end 61 of the rails 59. Thereafter the completed building panel is delivered to a run-out conveyor 62 for storage, stacking or further processing.

Figure 21:
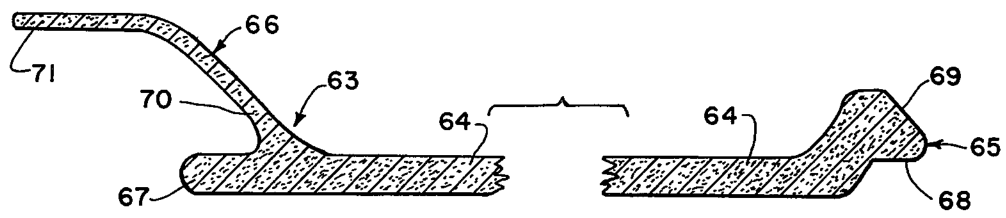
FIGS. 21 and 22 are broken cross-sectional views of a typical profiled glass fiber reinforced gypsum product of the present invention, particularly applicable as building panel liner sheets.
Figure 22:
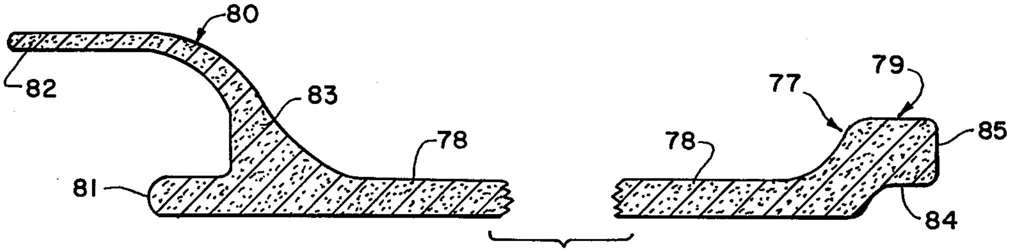

Typical panels according to this invention are illustrated in FIGS. 21 and 22. The panel of FIG. 21 is identified by the numeral 63 and has an essentially flat web 64 with a connection flange 65 along one edge and a connection flange 66 which extends away from the web 64 from a location inboard from the left-hand edge 67 of the web 64. It will be noted that the flanges 65 and 66 both extend upwardly and outwardly away from the web 64. The flange 65 has a smooth surface 68 which is essentially parallel to the web 64 and a smooth surface 69 which is essentially parallel to an intermediate portion 70 of the flange 66. The flange 66 also has an end portion 71 which is essentially parallel to the web 64.

Figure 23:
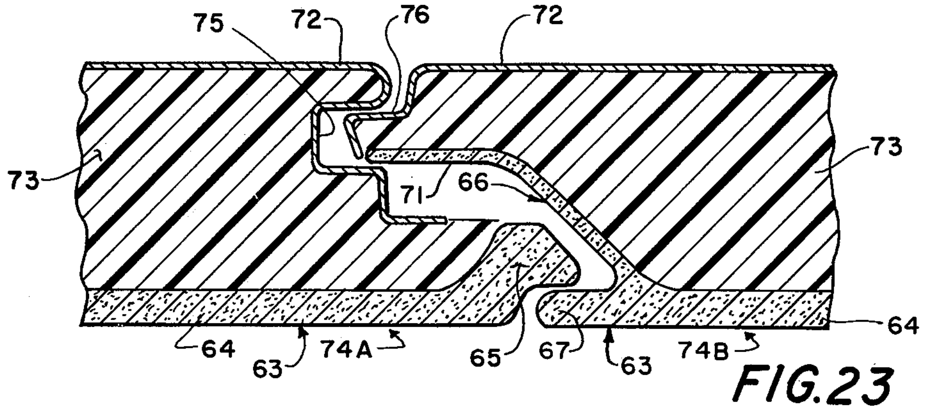
FIGS. 23 and 24 are fragmentary illustrations of a connection joint between abutting building construction panels employing the liner sheets shown in FIGS. 21 and 22 respectively.

It will be observed from FIG. 23 that the liner panel 63 may be assembled into a building construction panel having an outer facing sheet 72 which may be formed from metal, reinforced plastics, cement asbestos, glass fiber reinforced concrete or similar weather-resistant materials. A supply of foamed-in-place insulating composition 73 fills the space between the liner panel 63 and the outer facing sheet 72. The panel is indicated generally by the numeral 74. FIG. 23 shows the right-hand portion 74A of one panel and the left-hand portion 74B of another panel. The two panels 74A, 74B are assembled in FIG. 23 with the flange 65 of the GRG liner sheet overlapping the left-hand extension 67 of the web 64 adjacent to the flange 66. The outer facing sheet 72 has a channel 75 along its right-hand edge and has a flanged tongue 76 along its left-hand edge. The remote edge of the flanged tongue 76 and the remote edge 71 of the liner flange 66 are disposed within the channel 75.

The resulting panel assembly presents a view only of the glass fiber reinforced gypsum liner panels 63 along the inside surface and presents a view only of outer facing sheets 72 for the external viewer. The panel of FIG. 23 has a thickness of 1 to 3 inches, preferably about 1.5 inches. The panels have a width from side-to-side of 12 inches to about 36 inches. Wider panels up to 60 inches also are contemplated. The panel lengths range from about 12 inches to about 40 feet. The upper length limit is determined by handleability and transport restrictions for the panel. The thickness of the web 64 ranges from about 1/16 inch to about ½ inch. Where the outer facing sheet 72 is metal, 26 gauge through 18 gauge steel or aluminum sheets are contemplated. The outer facing sheet 72 may be coated with any weather-resistant coating such as paint, porcelain enamel, plastic films.

Figure 24:
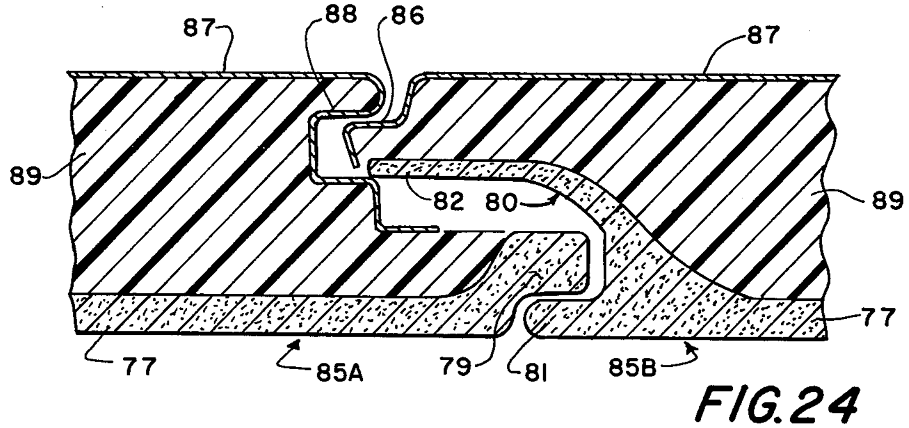

A further embodiment is illustrated in FIGS. 22 and 24 wherein the liner panel, identified by the numeral 77, has a web 78, with a right-hand flange 79 and a left-hand flange 80. The left-hand flange 80 extends away from the web 78 starting at a location which is inboard from the left-hand edge 81 of the web 78. The flange 80 has a relatively thin remote edge 82 which is generally parallel to the web 78. The intermediate portion of the flange 80 converges from the web 78 as a narrowing prism 83. The right-hand flange 79 has one surface 84 which is substantially parallel to the web 78 and another surface 85 which is substantially normal to the web 78.

When the liner panel 77 of FIG. 22 is incorporated into a building construction panel 85 as shown in FIG. 24, the flange 79 of a left-hand panel 85A enters into the space between the flange 80 and the outboard extension at the edge 81 of a right-hand panel 85B. The remote portion 82 of the flange 80 cooperates with a flanged tongue member 86 of an outer facing sheet 87 to form a tongue which fits into a channel 88 provided on the right-hand side of the outer facing sheet 87 of the panel 85A. The resulting panels are similar to the panels illustrated in FIG. 23 in that the viewer from the interior of the building sees only surfaces of glass reinforced gypsum liner panels 77, whereas the viewer from the exterior of the building sees only the outer facing sheets 87. Preferably the space between the outer facing sheets 87 and the liner panels 77 is filled with foamed-in-place insulating material 89, preferably foamed-in-place polyurethane foam.

The dimensions of the panels of FIGS. 22 and 24 correspond with the dimensions already set forth for the panels of FIGS. 21 and 23.

We claim:

1. A method for continuously forming glass fiber reinforced gypsum products comprising:

(1) shaping a continuous water impervious formable sheet to a pre-selected trough-like profile and delivering the said formable sheet in the said pre-selected trough-like profile into a slurry deposition station;

(2) depositing on the said formable sheet in the said slurry deposition station a ribbon comprising 2 to 8 parts by weight of glass fibers having an average length in the range of 0.5 to 4.0 inches;

100 parts by weight gypsum hemi-hydrate;

22 to 45 parts by weight water;

(3) delivering the said formable sheet with the said ribbon thereupon from the said slurry deposition station and into a ribbon compaction station;

(4) compacting the said ribbon against the said formable sheet in the said compaction station while maintaining the said formable sheet in a pre-established trough-like profile;

(5) delivering the compacted ribbon and formable sheet to a setting station and maintaining the said formable sheet in the said pre-established trough-like profile until the said ribbon has hardened;

(6) thereafter cutting the said hardened ribbon transversely into lengthwise segments having the said pre-established trough-like profile;

(7) carrying out steps (2) through (6) without deliberately removing liquid water from the said ribbon.

2. The method of claim 1 wherein the said formable sheet is separated from the said hardened ribbon prior to cutting of the ribbon into the said lengthwise segments.

3. The method of claim 1 wherein the said formable sheet is retained in surface engagement with the said set ribbon while the said set ribbon is cut into the said lengthwise segments and thereafter the said membrane serves as a surface protecting membrane for the undersurface of the said lengthwise segments.

4. The method of claim 1 wherein the said formable sheet is drawn through the said slurry deposition station, the said compaction station and the said slurry setting station by means of a moving belt.

5. The method of claim 1 wherein the said slurry is deposited in the said slurry deposition station by (1) developing at least one spray of aqueous gypsum hemi-hydrate slurry having a weight ratio of water-to-hemi-hydrate of 0.22 to 0.45;

(2) developing a moving stream of glass fibers having an average length in the range of 0.5 to 4.0 inches;

(3) impinging said spray against said stream to produce a slurry-wetted stream of glass fibers;

(4) collecting the said slurry-wetted stream as a ribbon on the said water impervious formable sheet.

6. The method of claim 1 wherein the said formable sheet is profiled by means of side rails contoured to a pre-established profile.

7. The method for forming glass fiber reinforced gypsum articles which comprises:

(1) depositing on a water impervious formable sheet a layer of aqueous slurry of gypsum hemi-hydrate;

(2) thereafter depositing on the said layer a mixture of (a) glass fibers having a random orientation and an average length in the range of 0.5 to 4.0 inches, and (b) aqueous slurry of gypsum hemi-hydrate;

(3) wherein the said mixture constitutes a ribbon containing 2 to 8 parts by weight of glass fibers 100 parts by weight gypsum hemi-hydrate and 22 to 45 parts by weight water;

(4) compacting the said ribbon and recovering a hardened article;

(5) carrying out steps (1) through (4) without deliberately removing liquid water from the said ribbon.

8. The method of claim 7 wherein the said compacting is accomplished by drawing the said ribbon beneath contoured rollers.

9. The method of claim 8 wherein a second water impervious formable sheet is interposed between the said contoured rollers and the said ribbon.

10. The method of claim 8 wherein the said contoured rollers urge the said water impervious formable sheet against side rails having a pre-established profile.

11. The method of claim 10 wherein the said water impervious formable sheet is maintained in engagement with the said side rails by application of suction between the said formable sheet and the engaged surface of each side rail.

* * * * *